United States Patent Office 3,644,507
Patented Feb. 22, 1972

3,644,507
THERMAL PURIFICATION OF TEREPHTHALIC ACID USING IODINE OR BROMINE CATALYSTS
Enrique R. Witt and Jorge A. Blay, Corpus Christi, Tex., assignors to Celanese Corporation, New York, N.Y.
No Drawing. Filed Nov. 29, 1968, Ser. No. 780,265
Int. Cl. C07c 51/42
U.S. Cl. 260—525                                    20 Claims

ABSTRACT OF THE DISCLOSURE

A process for the purification of crude terephthalic acid (TPA) by heating the crude TPA and a liquid medium in the presence of an iodine or bromine catalyst to an elevated temperature followed by cooling of the heated mixture so as to crystallize the TPA. The heating required is to a temperature above about 275° C. and should preferably be to a temperature such that no TPA remains as a solid.

BACKGROUND OF THE INVENTION

The present invention relates to the purification of terephthalic acid. More particularly, the present invention relatives to the purification of terephthalic acid containing such impurities as 4-carboxybenzaldehyde.

Terephthalic acid is presently a very valuable industrial raw material because of its use in the manufacture of polyester synthetic fibers such as poly(ethyleneterephthalate). However, commercial production of these polyester fibers has generally not been the direct esterification of terephthalic acid because of the adverse effects of small amounts of impurities in the terephthalic acid. Instead the terephthalic acid is usually esterified with methanol to form dimethyl terephthalate which is turn is transesterified with the appropriate glycol and polymerized to form the polyester. Heretofore the conversion to dimethyl terephthalate has been considered necessary in order to eliminate the impurities in the terephthalic acid but it is readily apparent that it would be desirable to form the polyester directly from the terephthalic acid in order to eliminate the expensive and time consuming esterification, distillation and tranesterification necessary when utilizing dimethyl terephthalate.

The adverse impurities in terephthalic acid are those arising during the course of its manufacture and therefore the particular impurities present may vary according to the process of manufacture. At the present time there are several methods for producing terephthalic acid such as the oxidation of alkylbenzenes. These oxidations of alkylbenzenes may be conducted for example by oxidizing p-xylene in the liquid phase with 30 to 40% nitric acid at about 200° C., either with or without added air or oxygen. Another method for the oxidation of p-xylene is with an oxygen-containing gas (such as air) at temperatures 150° C. and in the presence of a heavy metal catalyst such as cobalt acetate or other Group VIII metal salts. This latter method is disclosed in U.S. Pats. 3,240,-803; 3,171,856; 3,139,452; 3,119,860; 3,064,044; 3,004,066 and British Pat. 1,004,895. An alternative method for preparing terephthalic acid by the oxidation of alkylbenzenes is disclosed in U.S. Pat. 2,746,990 wherein diisopropyl benzene is oxidized to terephthalic acid. The methods for producing terephthalic acid are not however limited to the oxidation of alkylbenzenes and U.S. Pats. 3,243,457 and 3,096,366 disclose the production of terephthalic acid by the rearrangement of potassium salts of benzoic or phthalic acids. Such rearrangements are generally known as Henkel rearrangements. Regardless of the method of manufacture, the terephthalic acid will generally contain various impurities which are deterimental to polyester production, especially from the standpoint of color. The terephthalic acid produced by the processes now well known will generally have less than about 5% by weight of impurities in it. Although all of the troublesome impurities have not been identified, some of the more common impurities are 4-carboxybenzaldehyde, p-toluic acid, o-phthalic acid, m-phthalic acid, and p-acetylbenzoic acid. Of these impurities, 4-carboxybenzaldehyde is generally the most troublesome impurity and the amount of it has been used extensively as a criterion of effectiveness in purification processes. Of course the specifications for a fiber grade terephthalic acid vary according to the type of polymerization process to be used in forming the polyester and according to the process of manufacturing the terephthalic acid, but the specifications for fiber grade terephthalic acid generally require less than about 50 parts per million 4-carboxybenzaldehyde. In view of the stringest purity requirements the term "crude" terephthalic acid as used herein is not meant to cover only terephthalic acid having large amounts of impurities but is also meant to include terephthalic acid having extremely small but undesirable amounts of impurities. For example, terephthalic acid containing at least 40 parts per million of 4-carboxybenzaldehyde might be too impure for some end uses and thus could be considered "crude" terephthalic acid as far as the present invention is concerned. "Crude" terephthalic acid as used herein is also intended to cover and include terephthalic acid which may or may not have been subjected to other types of purification processes so as to partially purify the terephthalic acid.

Various processes have been devised to treat terephthalic acid for the removal of organic impurities and other impurities contributing to the quality and color of polyesters. Some of these processes include activated charcoal treatment of solutions of water soluble salts, alkaline oxidations with hypohalite or permanganate solutions of water soluble salts, water leaching, and treatment of aqeous soluble salts, water leaching, and treatment of aqueous solutions of alkaline salts with carbon monoxide. It has also been disclosed in such patents as U.S. 2,923,736 that crude terephthalic acid may be purified by sublimation followed by fractional condensation of the terephthalic acid from the resulting gas.

It is also disclosed in copending U.S. Patent application Ser. No. 705,600 filed Feb. 15, 1968, that crude terephthalic acid may be purified by heating it in an inert, liquid medium to a temperature above 325° C. followed by crystallization of the terephthalic acid from solution.

SUMMARY

It is thus an object of the present invention to provide a process for the purification of impure terephthalic acid. It is a further object of the present invention to provide a process for the purification of crude terephthalic acid so as to produce a terephthalic acid suitable for fiber forming. Another object of the present invention is to provide a process for the reduction of impurities such as 4-carboxybenzaldehyde in an impure terephthalic acid. Additional objects will become apparent from the following description of the present invention.

These and other objects are accomplished by the present invention which in one of its embodiments is a method for improving the purity of a crude terephthalic acid comprising (1) heating crude terephthalic acid in the presence of an inert liquid medium and an iodine or bromine catalyst to a temperature of at least 275° C., said temperature also being one at which no more than about 50% of the terephthalic remains as a solid, the pressure being sufficient to maintain a liquid phase at temperatures below the critical temperature, (2) cooling the terephthalic acid and liquid medium so as to crystallize terephthalic acid and (3) recovering the thus crystallized, purified terephthalic acid. By the term "pressure being sufficient to maintain a liquid phase at temperatures below the critical temperature" is meant that if the required heating to above the required temperature of 275° C. does not exceed the critical temperature of the liquid phase present, then the pressure must be sufficient to maintain this liquid phase. Likewise, if the critical temperature is exceeded, then the pressure must be at least that which would cause a liquid phase to exist if the temperature were lowered to below the critical temperature. Although applicants do not wish to be bound by any particular theory, it appears that many of the undesirable impurities, and in particular the 4-carboxybenzaldehyde impurities, are being selectively destroyed or decomposed during the heating step of the present invention, and it has been found that the presence of iodine or bromine catalysts enhance this decomposition. The products of the decomposition either remain in the mother liquor during recrystallization or remain in the terephthalic acid as impurities which are not especially harmful or undersirable. Regardless of the mechanism involved, the present process does provide purification above that obtained in a recrystallization process wherein for example a 5% slurry of terephthalic acid is merely heated to a temperature sufficient to dissolve it (such as about 250° C.) followed by recrystallization.

DESCRIPTION OF THE PREFERRED EMBODIMENTS

As may be seen from the above, the present invention calls for heating crude terephthalic acid at temperatures above 275° C. such that no more than 50% of the crude acid remains as a solid although it is recommended that the heating be to a temperature such that no more than 25%, and preferably none, of the terephthalic acid remains as a solid. Since the heating step of the present invention is also limited to pressures sufficient to maintain a liquid phase at temperatures less than the critical temperature of the liquid phase, this means that at least 50% (and preferably 100%) of the terephthalic acid must be in the liquid phase (or in a gas phase which is at equilibrium with the liquid phase) if the critical temperature is not exceeded during the heating step. Whether this liquid phase which is present in some embodiments of the present invention is a solution of terephthalic acid in the inert liquid medium, is a solution of the inert liquid medium in the terephthalic acid or is merely a eutectic mixture of the two is not always clear. In some cases such as when the terephthalic acid is present in only very small percentages, it appears that the terephthalic acid does actually go into solution in the liquid medium. However, when treating a mixture containing for example 85% terephthalic acid and 15% liquid medium such as might be the composition of wet filter cake, it is not exactly clear what the liquid phase should be called. As pointed out above when operating the present invention such that a liquid phase is present, there might or might not be a gas phase in equilibrium with the liquid phase depending on the method used for heating. For example, if one started heating a liquid-solid slurry at autogenous pressure in a closed container which was completely filled with the liquid-solid slurry, one should have only a single liquid phase present or a liquid-solid two phase system present unless the critical temperature of the liquid phase was exceeded. It has also been observed in runs made in sealed capillary tubes that when one starts heating a sealed tube which is less than completely full but is over about half full of liquid (or liquid-solid slurry), the liquid phase will sometimes expand to completely fill the tube before the critical temperature is reached. Thus in these situations a two-phase system is converted to a single phase system prior to reaching the critical temperature. In other runs made in sealed the tubes wherein the tubes were less than half-full of liquid prior to heating, it was generally observed that a gas phase remained in equilibrium with the liquid phase until the critical temperature was reached at which time the interface between the gas phase and liquid phase would disappear.

The pressure limitation called for in the present process also means that if the critical temperature is exceeded, then at least about 50% (and preferably 100%) of the terephthalic acid and the inert liquid medium must exist as a single plasma-like phase. The term "plasma-like phase" is used in describing the physical state of a material which has been heated above the critical temperature since the material does not really seem to behave like a true gas but instead seems to have properties of both a liquid and a gas.

The actual final physical state of the material being heated and its physical state during the heating will of course vary according to the amount of terephthalic acid initially present, the liquid medium being used, and the final temperature reached during heating. Thus in heating a slurry of crude terephthalic acid and liquid medium in accordance with the present invention, all of the acid might go into solution in the liquid medium before 275° C. is reached, in which case one would continue heating the solution to a final treatment temperature of at least 275° C. or higher, which final treatment temperatures might or hight not be above the critical temperature of the liquid phase. At this point the applicant would like to point out that the treatment temperatures actually used in the present invention should generally be below about 440° C. and thus the temperatures will usually range from 275° C.–440° C., preferably 300 to 420° C. The heating period required for the process of the present invention, i.e. the length of time the temperature must be held at the required temperature of at least 275° C., may vary widely and will depend on the particular temperature being utilized, the amount of impurities present, the degree of purification desired, etc. For a given treatment temperature the reduction of impurities increases with time, likewise, for a given length of time the reduction of impurities will increase as the temperature is increased. Although an increase in the time of heating above the required temperature will result in a greater reduction if impurities, it has also been found that some terephthalic acid will decompose at these high temperatures. Therefore to avoid excessive losses of terephthalic acid by decomposition the heating period should generally be less than about two hours, for example from 10 seconds to 2 hours and is preferably from about 2 minutes to 30 minutes.

Going back to the various things that might take place when treating a mixture of crude terephthalic acid and liquid medium in accordance with the present invention, one might find upon reaching the required temperature of 275° C. that more than 50% of the crude terephthalic acid remained as a solid so that the temperature must necessarily be increased even higher until at least 50% of the crude acid solid does disappear. Usually as one heats the mixture all of the solid acid will disappear while there is still a liquid phase present, in other words before the critical temperature is reached. However, some observations have been made wherein it appeared that as the temperature of a mixture was increased, more and more of the solid terephthalic acid went into solution in the liquid medium (or formed a eutectic mixture or the like) but that the critical temperature of the liquid phase present was reached before all of the solid phase had disappeared. Thus a solid phase was present together with a plasma-like phase. When heating was continued the remaining solid gradually disappeared such that only a plasma-like phase was present. As those skilled in the art are well aware, it is extremely difficult to make observations at the critical point and at the temperatures involved in the present invention; therefore applicants do not wish to be bound by the foregoing observations.

The actual pressures developed in the heating step of the present invention may be relatively high since they must be at least that pressure which will maintain a liquid phase at temperatures below the critical. These pressures will of course vary according to the particular liquid medium being used, the final temperature of heating and the like. If the boiling point of the liquid medium is above the treatment temperature then atmospheric pressure will be sufficient but not for most liquids the pressure will be above 100 p.s.i.g. The process of the present invention is most conveniently operated at autogenous pressure, the volume of the system used for heating the desired volume of terephthalic acid in liquid medium being of course small enough that sufficient pressures are developed. If higher pressures are desired, nitrogen or other gases such as $CO_2$ may be added in order to maintain the desired pressure.

As was pointed out above the thermal treatment of terephthalic acid in a liquid medium is disclosed and claimed in copending application Ser. No. 705,600, however, it has been found that improved results are obtained if the process is conducted utilizing an iodine or bromine catalyst. It is pointed out that an iodine catalyst is vastly superior to a bromine catalyst and generally gives at least ten-fold better results than bromine. The iodine or bromine catalyst may be obtained by merely adding elemental iodine ($I_2$) or elemental bromine ($Br_2$) to the terephthalic acid-liquid mixture or it may be obtained by the addition of an iodine- or bromine-containing compound which will decompose or ionize under the harsh conditions of the process to give iodine or bromine (probably as HI or HBr). For example one can use hydrogen iodide or hydrogen bromide, which along with $I_2$ or $Br_2$, is the preferred source of the catalyst or one can use suitable inorganic iodo or bromo salts or iodine- or bromine-substituted organic compounds which are unstable under the conditions of the process. The preferable inorganic salts are those salts of weak bases, e.g. ammonium iodide. The preferred iodine-or bromine-substituted organic compounds are of 1 to 20 carbon atoms and are the iodine- or bromine-substituted hydrocarbons or acyclic carboxylic acids. If the organic compound is an aromatic, then generally those having iodo- or bromo-substituents other than on the aromatic ring are preferred since the iodine- or bromine-substituted hydrocarbons which have their only substitution on the aromatic ring (such as bromobenzene or p-iodotoluene) are fairly stable and thus do not perform too well. However, those aromatics having iodo- or bromo-substituents other than on the aromatic ring, such as alpha-iodotoluene, are satisfactory as are the ring substituted cycloaliphatics such as iodo-cyclohexane. Of the substituted hydrocarbons the iodine or bromine-substituted aliphatics such as methylene bromide or ethylene chloride are preferred although it is again emphasized that elemental iodine or bromine and hydrogen iodide or hydrogen bromide are very much preferred as the source of the catalyst. Suitabel inorganic and organic compounds suitable as a source of the iodine or bromine catalyst are sodium iodide, sodium bromide, methyl iodide, iodoform, ammonium iodide, bromine hydrate, iodine monobromide, iodic acid, iodine tribromide, ethyl iodide, 1,2-diodoethane, allyl iodide, α-iodotoluene, α-iodoacetic acid, ethyl bromide, tetrabromo ethylene, α,α'-diiodo-p-xylene ethylene iodohydrin, addition product of HI to epoxidized soybean oil, 1-iodo-1,2,3,4-tetrahydro naphthalene, α-iodopropionic acid, 3-iodo-3-methyl octane, 1-iodo-2-methyl eicosane and 1,4-diodo butane.

The catalyst should generally be present in amounts so as to provide from about 10 p.p.m. to 2 percent by weight of iodine or bromine based on the combined weight of the crude terephthalic acid and liquid medium, preferably in amounts of from 100–5000 p.p.m., with the most preferable range being 50–5000 p.p.m. The ranges are for the amount of the iodine or bromine itself and not for the amount of a compound such as α-iodotoluene which is used to provide the iodine or bromine.

The process of the present invention may be carried out batchwise or in a continuous system and may be conducted in various types of equipment of various materials of construction, e.g. glass, stainless steel or titanium alloys. The crystallization called for in the present invention may be effected for example by merely cooling the solution such as in a tank crystallizer or may be effected in various other types of equipment such as crystallizing evaporators or vacuum crystallizers. The cooling during crystallization should generally be at least below 200° C. and is preferably below 100° C. in order to insure optimum recovery of the terephthalic acid. Since terephthalic acid is generally quite insoluble at ordinary temperatures in most liquids, the mixture of crude terephthalic acid in liquid medium to be treated by this process will generally be in the form of a slurry or other mixture wherein the terephthalic acid is present as a solid. The slurries or other mixtures can be formed such as by adding crude terephthalic acid crystals to the liquid medium or they can be the effluent of processes wherein the crude terephthalic acid is already mixed with the liquid medium such as the effluent of a reactor wherein p-xylene is oxidized to terephthalic acid. Slurries removed from oxidation reactors will contain from about 1 to 10 weight percent of water and it has been found that these slurries are best treated according to the present invention after first adding water thereto so that the slurry will contain from about 10 to 30 weight percent of water.

The process of the present invention can also be applied to mixtures of terephthalic acid and liquid medium which have been preheated to a temperature below the desired treatment temperature such that the terephthalic acid is in solution in the liquid medium. Also the process of the present invention may be operated such as by preheating the liquid medium alone to temperatures below or above 275° C. and then combining it with the crude terephthalic acid. In the process of the present invention, the crude terephthalic acid should be generally present in amounts of from about 3 to 95% based on the combined weight of the liquid medium and the crude terephthalic acid, preferably about 5 to 50% by weight.

The inert, liquid medium to be used in the present invention should be one which has a boiling point above 20° C. and a melting point below 200° C. and can be water, organic compounds or mixtures of organic compounds and water. Water alone is the least preferred medium so that it might be stated that the inert, liquid medium will be usually comprised of an organic compound (i.e. organic compounds alone or combined with water). By "inert" is meant that the liquid medium is one which does not react with the terephthalic acid to any appreciable extent under the conditions of the process and one which is not destroyed to any appreciable extent under the conditions of the process such as by reacting with itself, polymerizing, etc. When the amount of crude terephthalic acid is present in large amounts it has been found that more water is preferably present than when the crude terephthalic is present in small amounts. Thus if the mixture of terephthalic acid in liquid medium to be treated contains above 50% by weight, e.g. 50 to 95%, of terephthalic acid based on the combined weight of terephthalic acid and liquid medium, the inert liquid medium is preferably comprised of from about 10 to 95% by weight of water and 5 to 90% by weight of an organic medium. When the mixture contains above 75% by weight of terephthalic acid the inert liquid medium should be above 20% by weight of water. When the terephthalic acid is present in the mixture to be treated in amounts of less than 50% by weight, the liquid medium preferably comprises from about 0 to 75%, preferably 0 to 20%, by weight of water and 25 to 100%, preferably 80 to 100%, by weight of an organic medium. Usually the organic medium utilized will be a member selected from the group consisting of $C_5^+$ hydrocarbons, $C_2^+$ halohydrocarbons, carboxylic acids, hydrocarbon ethers, halohydrocarbon ethers, and mixtures thereof. By "$C_5$ hydrocarbons" is meant those having five or more carbon atoms while "$C_2^+$ hydocarbons" is intended to cover those having two or more carbon atoms. Of the hydrocarbons and halohydrocarbons that may be used, aromatics are preferred. Examples of suitable hydrocarbons, ethers, and halohydrocarbons include naphthalene, tetralin, diphenyl, xylene, benzene, dicyclopentadiene, cumene, n-hexane, cyclohexane, 2-methylheptane, the dodecanes, bibenzyl, chlorotoluene, diphenyl ether, ethylene glycol ether, chlorinated biphenyls, chlorinated naphthalenes, polyphenylene oxides, polyoxyethylenediols, chlorinated diphenyl ethers, $C_{10}$ aromatic isomers, and the like. Of the carboxylic acids, the lower ($C_1$ to $C_7$) aliphatic carboxylic acids such as acetic, butyric, and propionic are preferred with acetic being preferred over the others. Other carboxylic acids which may be used include benzoic acid, phenylacetic, chlorobenzoic acid, and chloroacetic acid. It is preferred to treat mixtures of terephthalic acid and liquid medium containing about 3–35% by weight of terephthalic acid and the preferred liquid medium for use in such cases is one consisting essentially of from 80 to 100% by weight of a $C_2$–$C_4$ aliphatic carboxylic acid and from 0 to 20% by weight of water.

The crude terephthalic acid to be treated according to the present invention may be derived from various sources and may be terephthalic acid which has been subjected to previous types of purification treatment. In general, the present invention is most useful in the purification of crude terephthalic acid derived from the oxidation of alkylbenzenes or from the rearrangement of inorganic salts of benzene carboxylic acids, however, best results are obtained when treating impure or crude terephthalic acid derived from the oxidation of p-xylene with an oxygen-containing gas in the presence of a heavy metal catalyst. Whatever the source of the terephthalic acid, it can be stated that the present invention is useful in treating crude terephthalic acid containing 4-carboxybenzaldehyde, p-toluic acid, o-phthalic acid, m-phthalic acid, and p-acetylbenzoic acid or mixtures thereof although it is most useful in removing 4-carboxybenzaldehyde impurities. As was pointed out above, terephthalic acid produced by the present well known processes will generally have less than about 5% by weight of impurities and quite frequently less than 1% by weight impurities. It should be kept in mind that the thermal treatment step of the present invention does not remove or decompose all types of impurities, e.g. metal impurities, which may be found in a crude terephthalic acid, and thus the present process may be combined with other purification treatments such as simple recrystallizations. For example, when treating a mixture of 85% crude acid and 15% liquid medium in accordance with the present invention, it may be desirable to add additional liquid medium after the thermal treatment step and before the terephthalic acid is crystallized so as to quench and/or so that the crystallization will be from a more dilute solution and thus remove more of the impurities that are amenable to separation from the acid by crystallization from a solution. Instead of adding the liquid medium after the thermal treatment, the acid could first be crystallized, recovered, then redissolved and recrystallized from a solvent.

In order to illustrate specific embodiments of the present invention, the following examples are presented. In these examples all parts and percentages are on a weight basis unless otherwise specified.

EXAMPLE I

Several runs were made in which a capillary tube or a three-liter titanium rocking autoclave was charged half-full of a slurry of crude terephthalic acid and a liquid medium along with an additive which served as the source of an iodine or a bromine catalyst. The crude terephthalic acid charged contained about 4200 p.p.m. of 4-carboxybenzaldehyde as an impurity. The tube or autoclave was then sealed, quickly heated at autogenous pressure to the desired temperature of treatment and held at that temperature for the desired period of time. In all cases the crude terephthalic acid was completely dissolved. Following the heating period, the tube or autoclave was cooled to about room temperature so as to crystallize the terephthalic acid and these terephthalic acid crystals recovered, washed with water, and analyzed. The result and conditions of the several runs are shown in the following table with all parts and percentages being by weight. The amount of the additive is based on the combined weight of terephthalic acid plus liquids in the slurry. In the table "TPA" stands for terephthalic acid and "CBA" stands for 4-carboxybenzaldehyde in the product.

TABLE

| | Slurry composition | | | Conditions | | |
|---|---|---|---|---|---|---|
| Run No. | TPA, percent | Liquid | Additive | Temp., °C. | Time, min. | CBA, p.p.m. |
| 1 | 80 | 10% acetic, 10% $H_2O$ | None | 400 | 20 | 1,000 |
| 2 | 80 | ...do... | 50 p.p.m. HI | 400 | 20 | 50 |
| 3 | 90 | 10% $H_2O$ | None | 400 | 20 | 629 |
| 4 | 90 | ...do... | 100 p.p.m. HI | 400 | 20 | 213 |
| 5 | 15 | 81% acetic, 4% $H_2O$ | None | 325 | 15 | 510 |
| 6 | 15 | ...do... | 650 p.p.m. KI | 325 | 15 | 290 |
| 7 | 15 | ...do... | 80 p.p.m. $I_2$ | 325 | 15 | 405 |
| 8 [1] | 15 | ...do... | 1,000 p.p.m. $I_2$ | 325 | 15 | 35 |
| 9 | 15 | ...do... | 300 p.p.m. HBr | 325 | 15 | 450 |
| 10 | 15 | ...do... | 1,000 p.p.m. $Br_2$ | 325 | 15 | 180 |
| 11 | 15 | ...do... | 1,700 p.p.m. α-iodotoluene. | 325 | 15 | 90 |
| 12 | 15 | ...do... | 1,000 p.p.m. $SbI_3$ | 325 | 15 | 305 |
| 13 | 15 | ...do... | 1,000 p.p.m. CsI | 325 | 15 | 280 |
| 14 | 15 | ...do... | 1,000 p.p.m. $GeI_4$ | 325 | 15 | 75 |
| 15 | 15 | ...do... | 1,100 p.p.m. $I_2$ | 360 | 15 | 4 |
| 16 | 15 | ...do... | 1,100 p.p.m. $I_2$ | 330 | 15 | 20 |
| 17 | 15 | ...do... | 4,060 p.p.m. $I_2$ | 310 | 8 | 68 |
| 18 | 15 | ...do... | 2,000 p.p.m. HI | 300 | 10 | 200 |
| 19 [1,2] | 15 | 85% propionic | 1,000 p.p.m. $I_2$ | 360 | 15 | 48 |
| 20 | 15 | ...do... | 1,000 p.p.m. HI | 325 | 15 | 150 |
| 21 [1] | 30 | 66.5% acetic, 3.5% $H_2O$ | 1,000 p.p.m. $I_2$ | 325 | 20 | 240 |
| 22 [1] | 15 | 77% acetic, 4% $H_2O$, 4% p-xylene. | 1,000 p.p.m. HI | 325 | 20 | 31 |
| 23 | 10 | 45% acetic, 45% benzene | ...do... | 325 | 10 | 140 |

[1] Autoclave runs.
[2] 1,500 p.p.m. $H_3PO_4$ added, stainless steel autoclave used.

EXAMPLE II

A three liter rocking autoclave constructed of titanium was charged with 250 grams of crude terephthalic acid, 1344 grams of glacial acetic acid, 71 grams of demineralized water and 1.67 grams of iodine ($I_2$). The crude terephthalic acid contained about 4500 p.p.m. of 4-carboxybenzaldehyde and 2000 p.p.m. of toluic acid. The autoclave was then sealed and quickly heated to 325° C. and maintained at that temperature for 15 minutes at which time the autoclave was rapidly cooled to room temperature so as to crystallize the terephthalic acid. Both the cooling and the heating were accompanied by rocking agitation. Although the physical state of the charge cannot be visually observed during this experiment, observations made in other experiments conducted in glassware indicated that when the temperature of the autoclave reached about 300° C. the terephthalic acid would have gone completely into solution in the liquid solvent. After the autoclave was cooled the contents of the autoclave were removed, filtered to isolate the solid terephthalic acid and then the solids were washed with water to remove the acetic acid present.

Both the dried terephthalic acid and the total filtrate (including mother liquor plus wash water) were analyzed. The total filtrate had a free iodine content of 0.05 weight percent. The dry, white terephthalic acid weighed 245.3 grams, had a 4-carboxybenzaldehyde content of about 30 p.p.m., a toluic acid content of less than 30 p.p.m. The iodine content of the recovered terephthalic acid was less than the 5 p.p.m. detachable limit for the X-ray method used. Thus all or practically all of the iodine stayed in the mother liquor or wash water.

EXAMPLE III

Three capillary tubes were filled about half-full of a slurry containing about 5% by weight of crude terephthalic acid and 95% by weight of a liquid consisting of a mixture of 95% acetic acid and 5% water. Also iodine ($I_2$) was added to the second and third tubes such that the slurry contained about 1000 p.p.m. of $I_2$. The crude terephthalic acid contained about 4500 p.p.m. of 4-carboxybenzaldehyde (4–CBA). The tubes were sealed and then the first of these tubes (which contained no iodine catalyst) was heated quickly to about 255° C. so as to completely dissolve the crude terephthalic acid. As soon as dissolution had occurred the tube and solution therein was quickly cooled to below 100° C. so as to crystallize the terephthalic acid from solution, and then these crystals were washed with water and analyzed.

The second of these tubes (which contained iodine) was also quickly heated to 255° C. so as to dissolve the crude diacid and maintained at that temperature for about 45 minutes. Following the heating period the tube was cooled and the terephthalic acid crystals recovered and analyzed in the same manner as for the first tube.

The third of these tubes was quickly heated to about 375° C. (above critical) and maintained at that temperature for about 5 minutes. Then the tube was cooled and the terephthalic acid crystals recovered and analyzed in the same manner as utilized for the first and second tubes.

The analysis of the terephthalic acid recovered from the first tube which represented a recrystallization purification, showed the terephthalic acid to have a 4–CBA content of 300 p.p.m. Analysis of the contents of the second tube, which involved a recrystallization purification plus a heating period of 45 minutes, showed the 4–CBA content of the terephthalic acid also to be 300 p.p.m. Thus the prolonged heating at ordinary recrystallization temperatures in the presence of an iodine catalyst did not serve to reduce the impurities below that value obtained by ordinary recrystallization.

However the contents of the third tube, which had been treated in accordance with the present invention, contained only about <15 p.p.m. of 4–CBA. It may be seen that the third tube treated in accordance with the present invention not only received the benefits of the recrystallization purification (which would have lowered the 4–CBA to about 300 p.p.m.) but also reduced the 4–CBA content about an additional 285 p.p.m. Thus the product recovered from the treatment of a slurry according to the present process, as was pointed out above, has less impurities than a simple recrystallization of the same slurry, the period of heating at the required temperature generally being directly proportional to the increased purification.

EXAMPLE IV

A slurry of 15% by weight of crude terephthalic acid containing 0.45% 4-carboxybenzaldehyde (4–CBA) and 85% by weight of a 95.5 acetic acid-water mixture was prepared. Hydrogen iodide was then added in an amount sufficient to provide about 200 p.p.m. iodine in the slurry. The 15% slurry was added to each of two identical tubes such that the slurry occupied 18% of the total volume of the first tube and 69% of the total volume of the second tube. The tubes were then sealed, quickly heated to 375° C. (above critical) for 5 minutes. In both cases the tubes were completely filled by the super-critical fluid during the 5 minutes heating time so that the expansion ratio of the material in the first tube was 5.6 times its original volume and was 1.45 times its original volume in the second tube. After the heating period, the tubes were cooled to crystallize the terephthalic acid which was then washed and analyzed. The terephthalic acid from the first tube contained about 280 p.p.m. of 4–CBA and that of the second tube contained only about 90 p.p.m. This example shows that in the present process, 4–CBA degradation appears to be faster at lower expansion ratios.

In order to prevent corrosion in metal vessels such as those constructed of stainless steel, a soluble phosphorus compound is preferably present in the process. A very wide variety of phosphorus compounds may be used but generally speaking the phosphorus compounds which are desirably present have a phosphorus atom linked to at least one oxygen or sulfur atom, preferably oxygen. This includes the addition of compounds to the process which already have a phosphorus-oxygen or phosphorus-sulfur linkage (such as orthophosphoric acid, triethyl phosphine oxide and phosphorus pentasulfide) or those which will form under the conditions of the process a compound or ion containing such a linkage. Some types of compounds which are desirable include the oxyacids of phosphorus, metal salts of the oxyacids of phosphorus, esters of the oxyacids of phosphorus, oxides of phosphorus and sulfides of phosphorus. Examples of the foregoing include orthophosphoric acid, pyrophosphoric acid, phosphoranedioic acid, orthophosphorus acid, hypophosphorus acid, monopotassium phosphate, trisodium phosphate, sodium acid orthophosphite, dipotassium pyrophosphite, tri-n-butyl phosphite, dimethyl methylphosphonate, triethyl phosphate, tricresyl phosphate, propyl phosphoric acid, ethyl diethylphosphinite, diethylphosphinic acid, ethyl phosphonic acid, ethyl diethylphosphinate, triethyl phosphine oxide, phosphorus trioxide, phosphorus pentoxide, phosphorus trioxide, phosphorus pentoxide, phosphorus tetrasulfide, and the like. Extremely wide amounts of a phosphorus compound may be utilized in the present invention, for example from amounts of about 1 p.p.m. to amounts of 50,000 p.p.m. based on the combined weight of the crude terephthalic acid and liquid medium.

The embodiments of the invention in which an exclusive property or privilege is claimed are defined as follows:

1. A method for improving the purity of a crude terephthalic acid comprising
  (a) heating crude terephthalic acid in the presence of an inert liquid medium and an iodine or bromine catalyst derived from the addition of $I_2$, HI or HBr to a temperature of at least 275° C., said temperature being one at which no more than about 50% of the terephthalic acid remains as a solid, the pressure being sufficient to maintain a liquid phase at temperatures below the critical temperature,
  (b) cooling the terephthalic acid and liquid medium so as to crystallize terephthalic acid, and
  (c) recovering the thus crystallized, purified terephthalic acid.

2. The process of claim 1 wherein the heating is continued until none of the terephthalic acid remains as a solid.

3. The process of claim 1 wherein said inert liquid medium comprises an organic medium selected from the group consisting of $C_5^+$ hydrocarbons, carboxylic acid, hydrocarbon ethers, halohydrocarbon ethers and mixtures thereof.

4. The process of claim 3 wherein said catalyst is an iodine catalyst derived from the addition of $I_2$ or HI.

5. The process of claim 4 wherein the temperature is from about 300 to 420° C.

6. The process of claim 1 wherein said catalyst is present in an amount sufficient to provide from about 0.05% to 2% by weight iodine or bromine based on the combined weight of terephthalic acid and liquid medium.

7. The process of claim 1 wherein said heating is for a period of time such that the recovered, purified terephthalic acid contains less impurities than that obtained in a simple recrystallization process wherein the same mixture of crude terephthalic acid and inert liquid medium are heated to a temperature sufficient to dissolve the crude terephthalic acid followed by cooling the resulting solution to recrystallize the terephthalic acid.

8. The process of claim 7 wherein said heating is at least to a temperature such that none of the terephthalic acid exists as a solid and wherein said crude terephthalic acid contains 4-carboxybenzaldehyde impurities.

9. The process of claim 8 wherein said terephthalic acid is present in amounts of from about 50 to 95% by weight based on the combined weight of terephthalic acid and liquid medium, wherein said liquid medium comprises about 10 to 95% by weight water and 5 to 90% by weight of an organic medium having a boiling point of at least 20° C. and a melting point less than 200° C., and wherein said catalyst is an iodine catalyst.

10. The process of claim 9 wherein said organic medium is $C_5^+$ hydrocarbon, $C_2^+$ halohydrocarbon, carboxylic acid, hydrocarbon ether, halohydrocarbon ether, or mixtures thereof.

11. The process of claim 9 wherein said liquid medium contains about 10 to 95% by weight and 5 to 90% by weight of an aliphatic $C_2$ to $C_4$ carboxylic acid.

12. The process of claim 11 wherein said catalyst is an iodine catalyst derived from $I_2$ or HI and is present in amounts so as to provide from about 0.05 to 2% by weight of iodine based on the combined weight of terephthalic acid and liquid medium.

13. The process of claim 8 wherein the crude terephthalic acid is present in amounts of from about 5 to 50% by weight based on the combined weight of crude terephthalic acid and inert liquid medium and wherein said inert liquid medium has a boiling point of at least 20° C. and a melting point of less than 200° C. and comprises from about 0 to 75% by weight water and from about 25 to 100% by weight of $C_5^+$ hydrocarbons, $C_2^+$ halohydrocarbons, carboxylic acids, hydrocarbon ethers, halohydrocarbon ethers, or mixtures thereof.

14. The process of claim 13 wherein said catalyst is an iodine catalyst derived from $I_2$ or HI.

15. The process of claim 14 wherein said inert liquid medium consists of about 0 to 20% by weight of water and 80 to 100% by weight of a $C_2$ to $C_4$ aliphatic carboxylic acid.

16. The process of claim 14 wherein the temperature is from about 300 to 420° C.

17. The process of claim 16 wherein said catalyst is present in amounts to provide from about 100 p.p.m. to 2% by weight iodine based on the combined weight of terephthalic acid and liquid medium.

18. The process of claim 17 wherein said inert liquid medium consists of about 0 to 20% by weight of water and 80 to 100% by weight of a $C_2$ to $C_4$ aliphatic carboxylic acid.

19. The process of claim 18 wherein said carboxylic acid is acetic acid.

20. The process of claim 19 wherein said catalyst is present in amounts to provide from about 500 to 5000 p.p.m. of iodine.

References Cited

UNITED STATES PATENTS 3,364,256   1/1968   Ichikawa et al.   260—525

FOREIGN PATENTS 842,998   8/1960   Great Britain   260—524
753,667   2/1967   Canada   260—525

LORRAINE A. WEINBERGER, Primary Examiner

R. S. WEISSBERG, Assistant Examiner